US 6,540,366 B2

(12) United States Patent
Keenan et al.

(10) Patent No.: US 6,540,366 B2
(45) Date of Patent: Apr. 1, 2003

(54) OVERHEAD PROJECTION SYSTEM

(75) Inventors: Vaughn E. Keenan, Calgary (CA); Robert Sirotich, Calgary (CA)

(73) Assignee: Smart Technologies, Inc., Calgary (CA)

( * ) Notice: Subject to any disclaimer, the term of this patent is extended or adjusted under 35 U.S.C. 154(b) by 0 days.

(21) Appl. No.: 09/810,431

(22) Filed: Mar. 19, 2001

(65) Prior Publication Data

US 2002/0131024 A1 Sep. 19, 2002

(51) Int. Cl.[7] ............................................... Q03B 21/14
(52) U.S. Cl. ....................................................... 353/79
(58) Field of Search ..................... 353/79, 98; 248/919, 248/920

(56) References Cited

U.S. PATENT DOCUMENTS

| | | | | | |
|---|---|---|---|---|---|
| 4,439,027 A | * | 3/1984 | Shioda et al. | ............... | 348/776 |
| 5,448,263 A | * | 9/1995 | Martin | ..................... | 178/18.03 |
| 5,490,655 A | | 2/1996 | Bates | ......................... | 248/329 |
| 5,743,503 A | * | 4/1998 | Voeller et al. | ........... | 248/284.1 |
| 5,808,704 A | * | 9/1998 | Yoshikawa et al. | ......... | 348/748 |
| 6,141,000 A | * | 10/2000 | Martin | ..................... | 178/18.03 |
| 6,179,426 B1 | * | 1/2001 | Rodriguez et al. | .......... | 353/119 |
| 6,219,183 B1 | * | 4/2001 | Doany | ......................... | 353/75 |

* cited by examiner

*Primary Examiner*—Russell Adams
*Assistant Examiner*—D. Ben Esplin
(74) *Attorney, Agent, or Firm*—Katten Muchin Zavis Rosenman

(57) ABSTRACT

An overhead projection system includes an overhead projector support assembly extending outwardly from a generally vertical support surface in a generally horizontal disposition. A display screen having a display surface is mounted on the support surface beneath the projector support assembly. A projector is mounted on the projector support assembly and is aimed to project images onto the display surface of the display screen. Preferably, the projector support assembly includes a governor in the form of a damper and spring arrangement to control downward pivotal movement of the projector support assembly when a load is placed on the projector support assembly and to return the projector support assembly to its generally horizontal disposition when the load is removed.

57 Claims, 12 Drawing Sheets

OVERHEAD PROJECTION SYSTEM

FIELD OF THE INVENTION

The present invention relates generally to projection systems and in particular to an overhead projection system and to an overhead projector support assembly.

BACKGROUND OF THE INVENTION

Overhead projection systems are well known in the art and typically include a ceiling mounted projector that is spaced from and aimed downwardly at a generally planar display surface onto which projected images are to be displayed. Unfortunately, ceiling mounted projectors suffer from a number of disadvantages. For example, some types of ceilings such as drop tile ceilings, do not provide the necessary support structure for overhead projectors. As a result, structural reinforcements for ceilings of this nature are necessary before overhead projectors can be ceiling mounted. Also, HVAC and/or lighting may be positioned on the ceilings at the positions where it is necessary to mount the projectors. If so, the HVAC and/or lighting must be moved before the projectors can be mounted. Furthermore, ceiling mounted projectors typically require specialized power and signal wiring that must be installed in the ceilings. In addition, registering ceiling mounted projectors with display screens requires specialized skill and calculations on the part of installers and typically leads to the use of expensive projectors with zoom and lens shift capabilities. These above-described problems result in expensive and onerous installations.

Mounting a projector to a wall surface has also been considered. For example, U.S. Pat. No. 5,490,655 to Bates discloses a video/data projector and monitor ceiling/wall mount. The wall mount includes a wall support assembly fixedly secured to a wall surface. A pair of struts extends horizontally from the wall support assembly. A projector/monitor adapter is supported by the ends of the struts. The wall support assembly includes a strut adapter that rests between a pair of adapter plates extending from a wall plate. A fastener secures the strut adapter to the adapter plates in a manner to permit rotation of the adapter plate and hence, the struts about a vertical axis.

Although Bates discloses an assembly for supporting a projector that is to be secured to a wall surface, the Bates wall mount suffers disadvantages. When a load is placed on the wall mount, the entire load is taken up by the wall mount and the wall surface due to the fact that the wall mount is static. If the load is significant, the load may cause damage to the wall mount and/or the wall surface. In addition, if it is necessary to service the wall mount and/or the projector supported thereon, a ladder or other similar device must be used to gain access to the wall mount and/or projector. As will be appreciated, improved overhead projection systems are desired.

It is therefore an object of the present invention to provide a novel overhead projection system and a novel overhead projector support assembly.

SUMMARY OF THE INVENTION

According to one aspect of the present invention there is provided an overhead projection system comprising:

an overhead projector support assembly extending outwardly from a generally vertical support surface in a generally horizontal disposition;

a display screen having a display surface mounted on said support surface beneath said projector support assembly; and a projector mounted on said projector support assembly and aimed to project images onto the display surface of said display screen.

Preferably, the projector support assembly is pivotably mounted on the support surface and is moveable from the generally horizontal disposition downwardly when a load is placed on the projector support assembly. A governor controls pivotal movement of the projector support assembly in a manner so that the boom pivots downwardly under a load generally at an unconstrained rate to avoid damage to the overhead projection system and/or support surface.

In a preferred embodiment, the governor is a damper and spring arrangement that automatically returns the projector support assembly to the generally horizontal disposition when the load is removed at a controlled generally constant rate. A releasable locking mechanism carried by the damper and spring arrangement is actuable to retain the projector support assembly in a downwardly extending condition.

In the preferred embodiment, the projector support assembly includes a single boom. The boom has one end pivotally coupled to the support surface. The projector is suspended from the opposite end of the boom with the damper and spring arrangement being disposed on the boom intermediate its ends. The damper and spring arrangement is constituted by a gas spring having one end fixed to the boom and an opposite end fixed to an element moveable along the boom. The moveable element moves along the boom towards the fixed end during downward pivoting of the boom thereby to compress the gas spring.

Preferably, the display screen is pivotally mounted on the support surface to allow the bottom of the display surface to be tilted towards the projector. The display screen may be a touch panel that generates control signals representing contacts with the touch panel. In this case, the overhead projection system further includes a computer that executes an applications program and provides image output to the projector. The touch panel, computer and projector form a closed loop to define an interactive display system whereby control signals generated by the touch panel are used by the computer to update the applications program and the image output provided to the projector. A console is disposed beneath the display screen and houses the computer.

In another embodiment, the support surface is an upright support member that is mounted on a wheeled cart. This allows the overhead projection system to be wheeled to the desired location making the overhead projection system fully portable.

According to another aspect of the present invention there is provided an overhead projection system comprising:

an overhead projector support assembly extending outwardly from a generally vertical support surface in a generally horizontal disposition;

a display screen having a display surface mounted on said support surface beneath said projector support assembly;

a projector mounted on said projector support assembly; and at least one reflective surface positioned to reflect images projected by said projector onto said display surface.

In one form, the overhead projection system is used in a rear projection environment. In this case, the display screen is mounted on the support surface and positioned so that the display surface covers an opening therein. The display surface is translucent so images projected onto the back of the display surface are visible when looking at the front of the display surface. In one embodiment, the projector is aimed away from the support surface. A mirror is mounted on the projector support assembly adjacent a distal end thereof and is positioned to reflect projected images backward onto the display surface of the display screen. In another embodiment, the projector is aimed towards the support surface. A pair of mirrors is mounted on the projector support assembly. A first mirror is positioned in front of the projector and a second mirror is positioned behind the projector. The first mirror is positioned to reflect projected images away from the support surface onto the second mirror. The second mirror is positioned to reflect projected images backward onto the display surface of the display screen.

According to yet another aspect of the present invention there is provided an overhead projector support assembly comprising:

at least one boom adapted to extend outwardly from a generally vertical support surface in a generally horizontal disposition and to support a projector at a location spaced from said support surface;

at least one coupling element adapted to couple pivotally one end of said at least one boom to said support surface to enable said at least one boom to be pivoted downwardly from said generally horizontal disposition under a load; and a governor to control pivotal movement of said boom.

According to still yet another aspect of the present invention there is provided a portable overhead projection system comprising:

a portable upright support member;

an overhead projector support assembly extending outwardly from said support member in a generally horizontal disposition;

a display screen having a display surface mounted on said support member beneath said projector support assembly; and a projector mounted on said projector support assembly and aimed to project images onto the display surface of said display screen, wherein said projector support assembly is pivotable from said horizontal disposition downwardly when a load is placed thereon.

The present invention provides advantages in that since the projector support assembly, which supports the projector, and the display screen are mounted on the same support surface, the projector and the display screen can be registered consistently and quickly. Also, since the boom pivots downwardly at a generally unconstrained rate whenever a load is placed on the boom and since the pivotal movement is controlled by the governor, the potential for damage to the overhead projection system and/or the support surface is significantly reduced.

The present invention also provides advantages in that since the projector support assembly can be pivoted downwardly and locked in position, maintenance and servicing of the projector and related cabling is facilitated obviating the need for a ladder or other similar device.

BRIEF DESCRIPTION OF THE DRAWINGS

Embodiments of the present invention will now be described more fully with reference to the accompanying drawings in which:

FIG. 4b is a cross-sectional view of FIG. 4a;

DETAILED DESCRIPTION OF THE PREFERRED EMBODIMENTS

Figure 1:
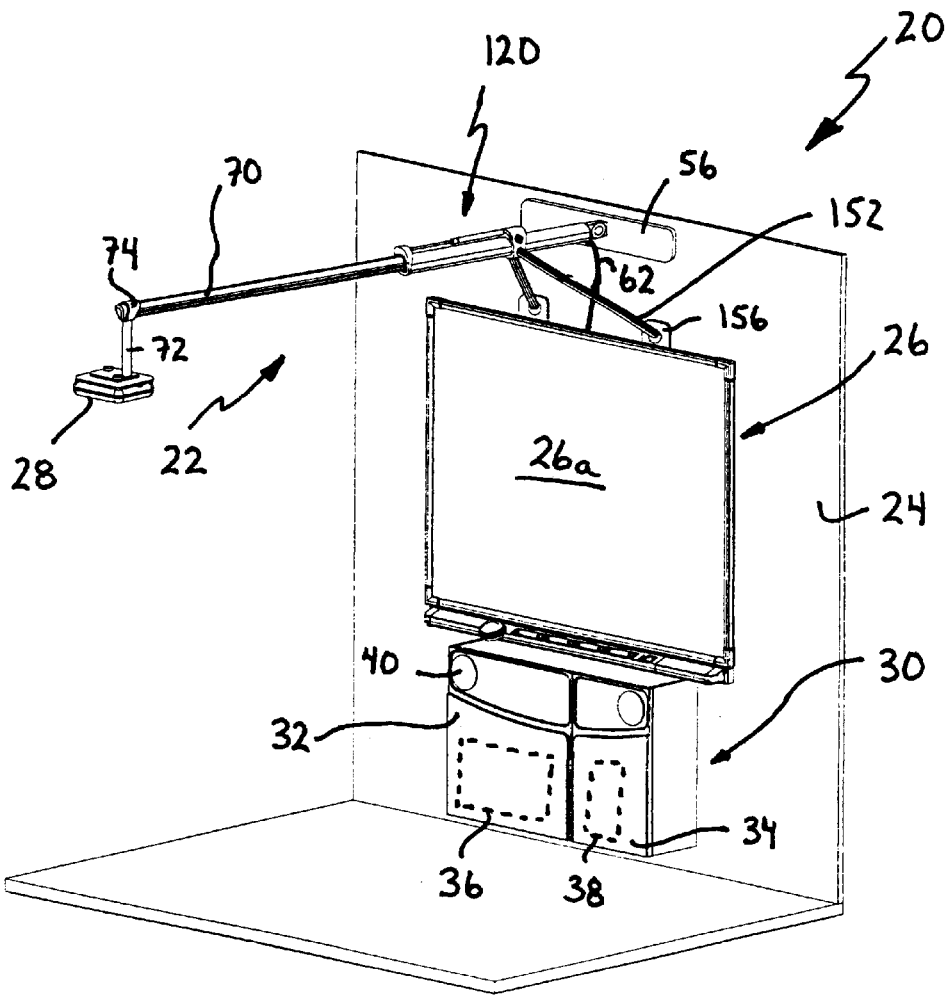
FIG. 1 is an isometric view of an overhead projection system in accordance with the present invention.
Figure 2:
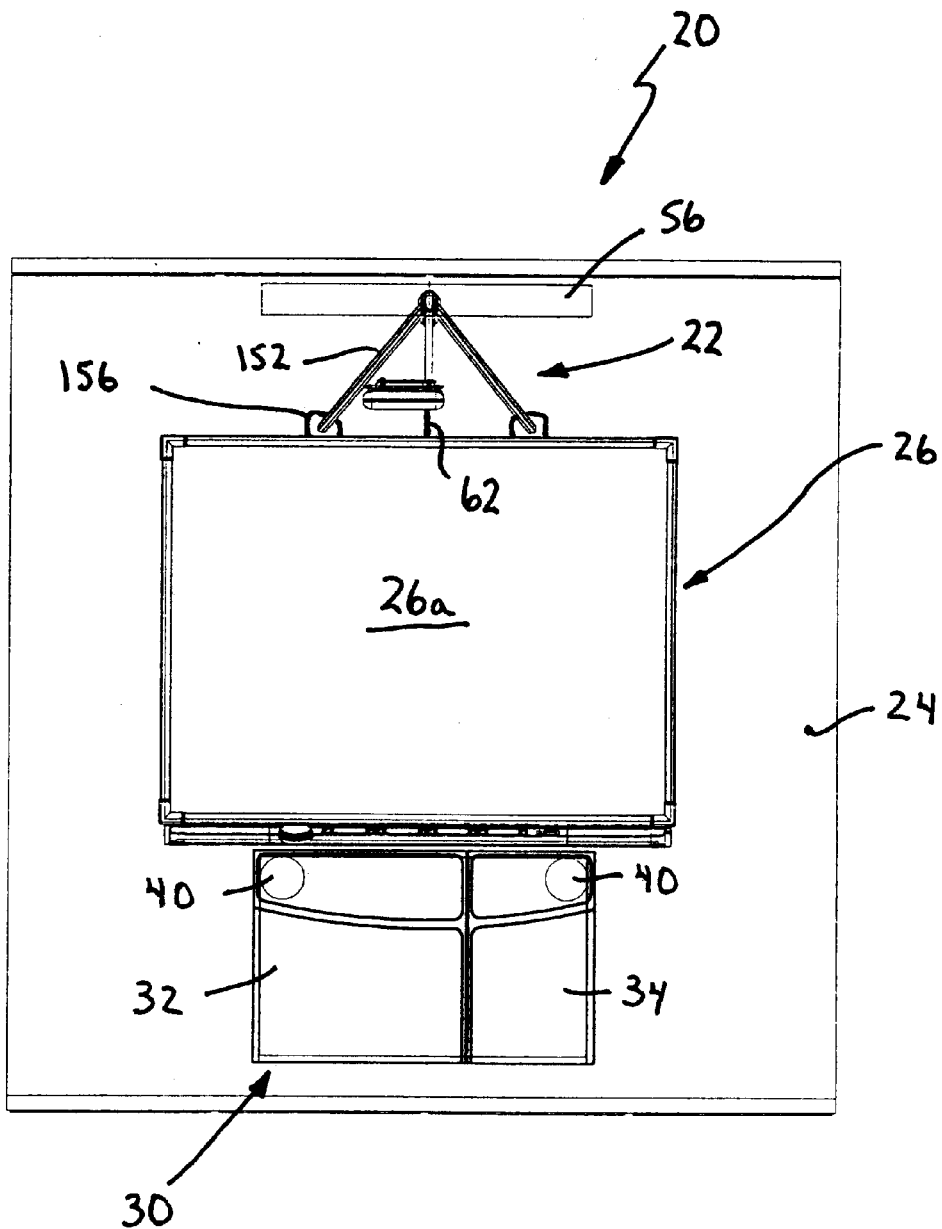
FIG. 2 is front elevational view of the overhead projection system of FIG. 1.
Figure 3:
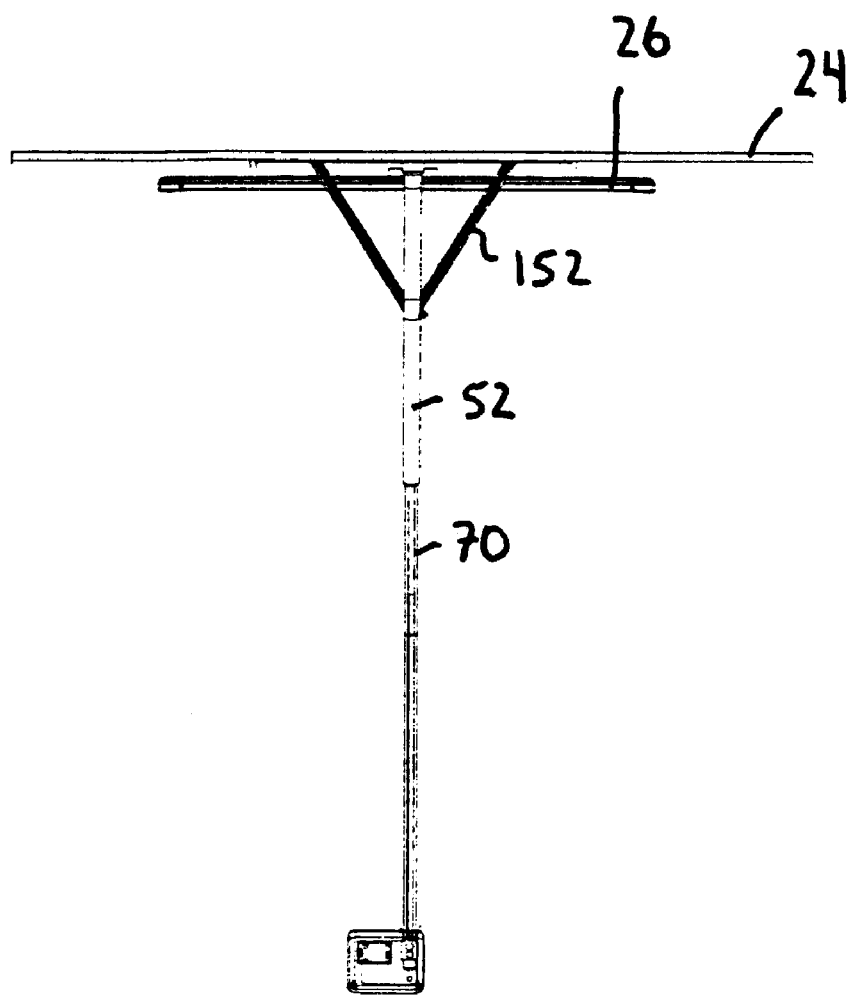
FIG. 3 is a top plan view of the overhead projection system of FIG. 1.
Figure 4A:
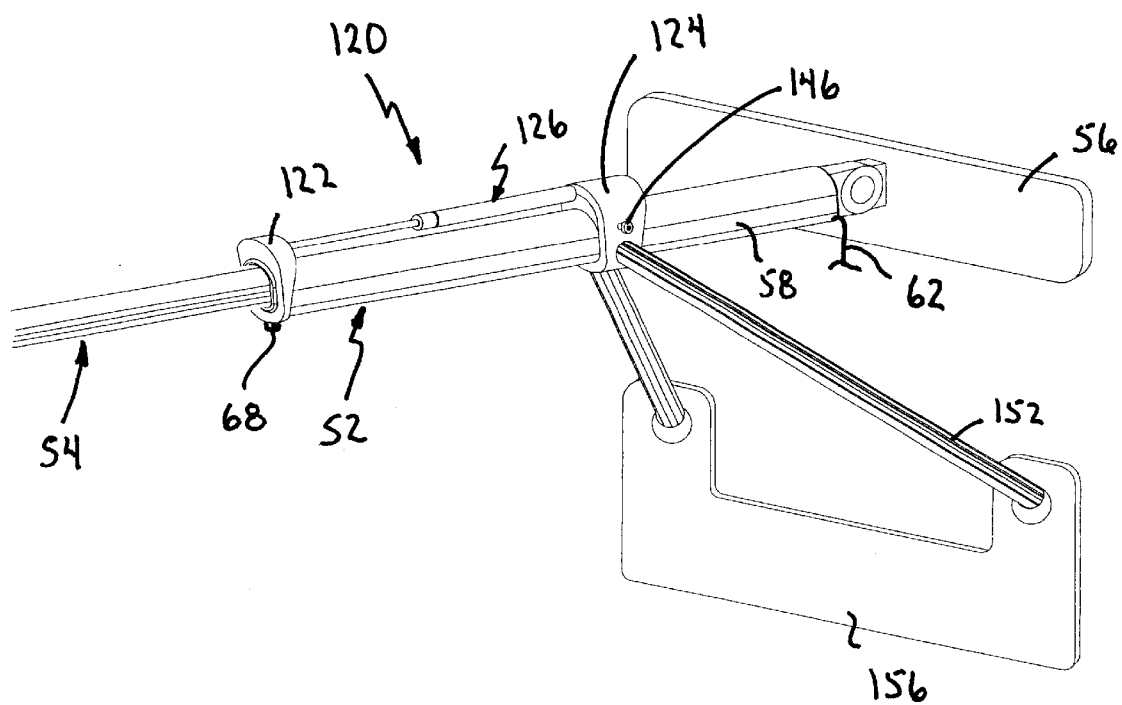
FIG. 4a is an isometric view of a governor forming part of the overhead projection system of FIG. 1.
Figure 4B:
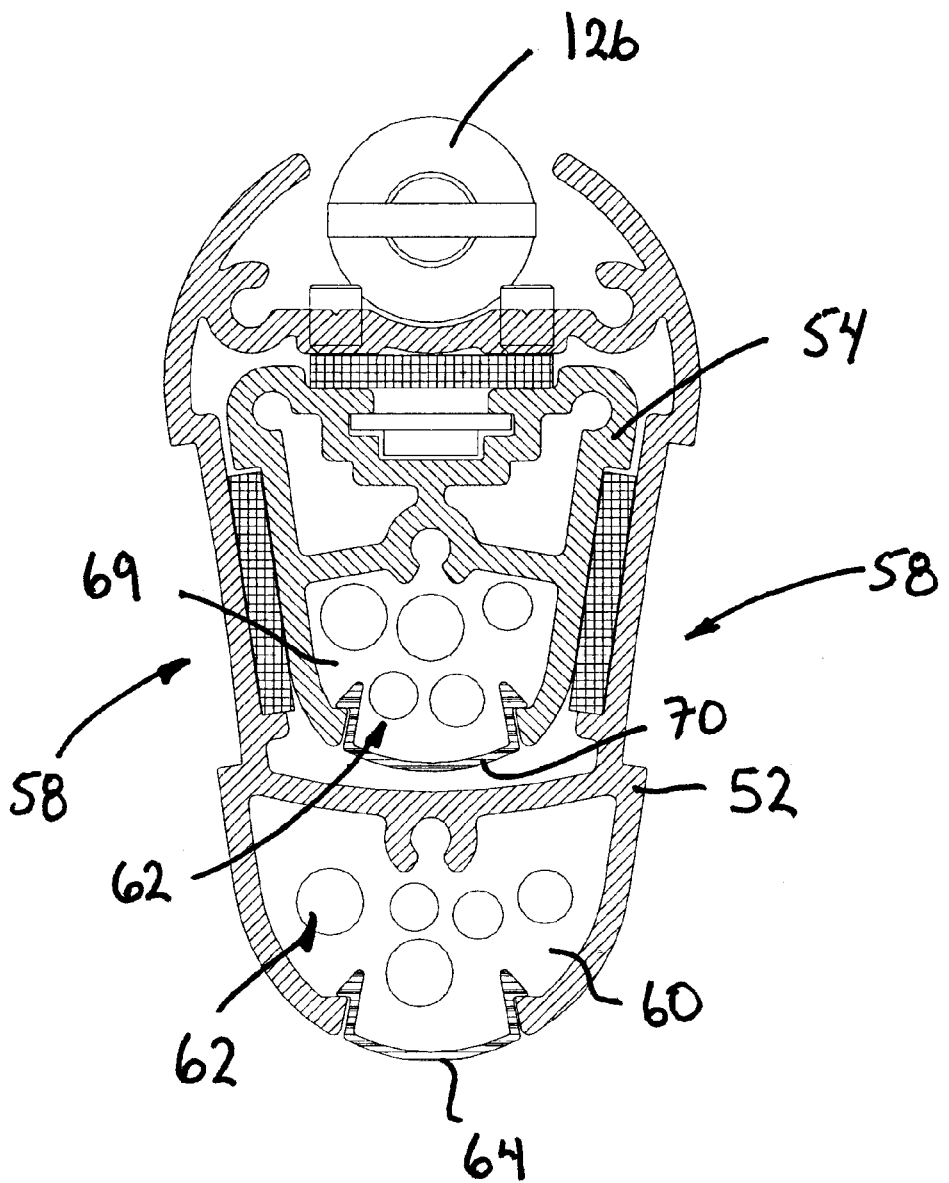

Turning now to FIGS. 1 to 3, an overhead projection system in accordance with the present invention is shown and is generally identified by reference numeral 20. As can be seen, overhead projection system 20 includes an overhead projector support assembly 22 that extends outwardly from a generally vertical support surface 24, such as a wall, in a generally horizontal disposition. A touch-sensitive display screen 26, such as that sold under the name SmartBoard by Smart Technologies Inc. of Calgary, Alberta, Canada, is also mounted on the wall 24 beneath the projector support assembly 22. A projector 28 is mounted on the projector support assembly 22 adjacent its distal end and is aimed to project images directly onto the display surface 26a of the touch sensitive display screen 26.

A console 30 is positioned beneath the touch sensitive display screen 26 and includes a pair of doors 32 and 34. A personal computer 36 executing one or more applications programs is supported on the inside of the door 32 while other peripherals such as for example, audio/visual equipment 38 is supported on the inside of the door 34. The audio/visual equipment 38 is connected indirectly to a pair of speakers 40 that is mounted on the console 30 above the doors 32 and 34 by way of the personal computer 36. With the doors 32 and 34 of the console 30 closed, the personal computer 36 and the audio/visual equipment 38 are conveniently housed.

The personal computer 36, touch-sensitive display screen 26 and projector 28 form a closed loop to define an interactive display system of the type disclosed in U.S. Pat. Nos. 5,448,263 and 6,141,000 to Martin, assigned to the assignee of the present invention, the contents of which are incorporated herein by reference. Thus, the touch sensitive display screen 26 outputs control signals in response to contacts made on the display surface 26a of the touch sensitive display screen 26. The control signals are conveyed to the personal computer 36, which uses the control signals to update the applications program being executed and to update the image output of the projector 28.

Turning now to FIGS. 1, 3, 4a and 4b, the projector support assembly 22 is better illustrated. As can be seen, the projector support assembly 22 includes a boom 50 configured as a two-part telescoping arrangement. Specifically, the boom 50 includes a main fixed length extrusion 52 and an extension 54 extending axially from the distal end of the main extrusion. The main extrusion 52 has one end pivotally mounted on a bracket 56 that is secured to the wall 24 by suitable fasteners (not shown). Guide channels 58 are formed in opposite sides of the main extrusion 52. A channel 60 is also provided in the undersurface of the main extrusion 52 to accommodate cabling 62 that extends between the personal computer 38 and the projector 28. A cap 64 runs along the bottom of the main extrusion 52 to hold the cabling 62 within the channel 60.

The extension 54 is slidably received by an internal channel formed in the main extrusion 52 and has a plurality of threaded calibration holes (not shown) provided therein. A locking fastener 68 is rotatable to engage a selected calibration hole. In this manner, the length by which the extension 54 extends axially from the main extrusion 52 can be adjusted. A channel 69 is also provided in the undersurface of the extension 54 to accommodate cabling 62. A cap 70 runs along the bottom of the extension to hold the cabling within the channel.

Figure 5:
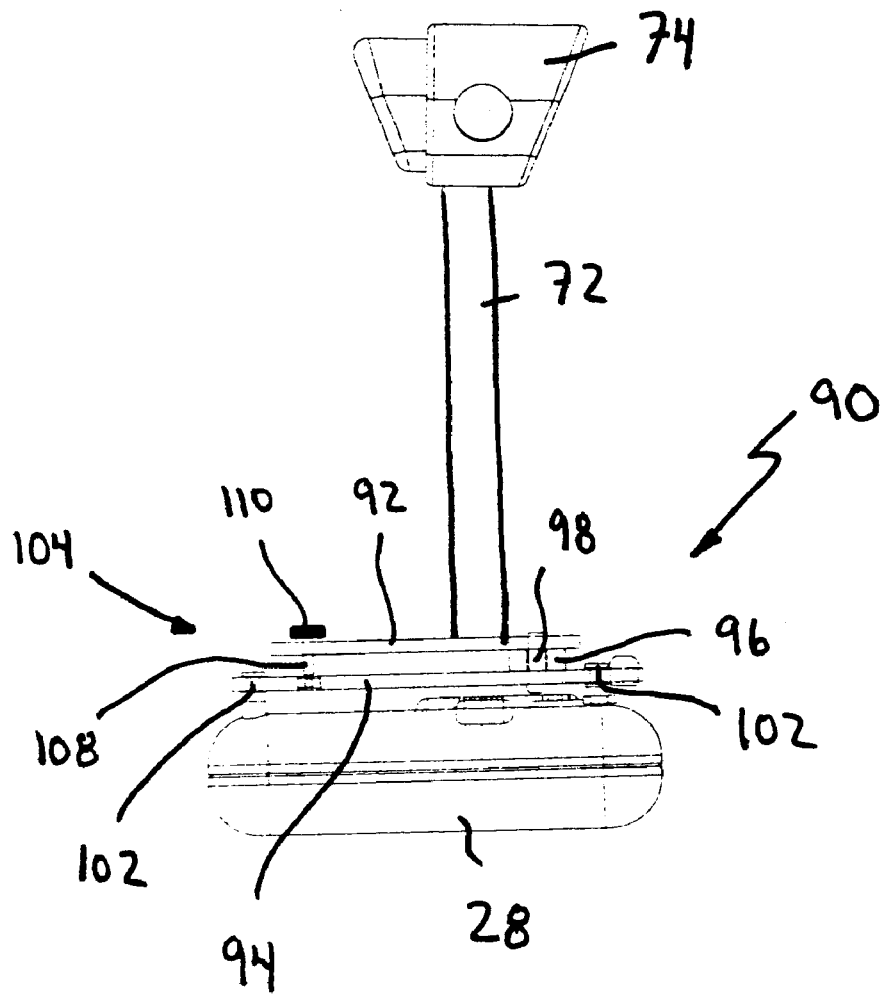
FIG. 5 is a side elevational view of a projector mounting assembly forming part of the overhead projection system of FIG. 1.
Figure 6:
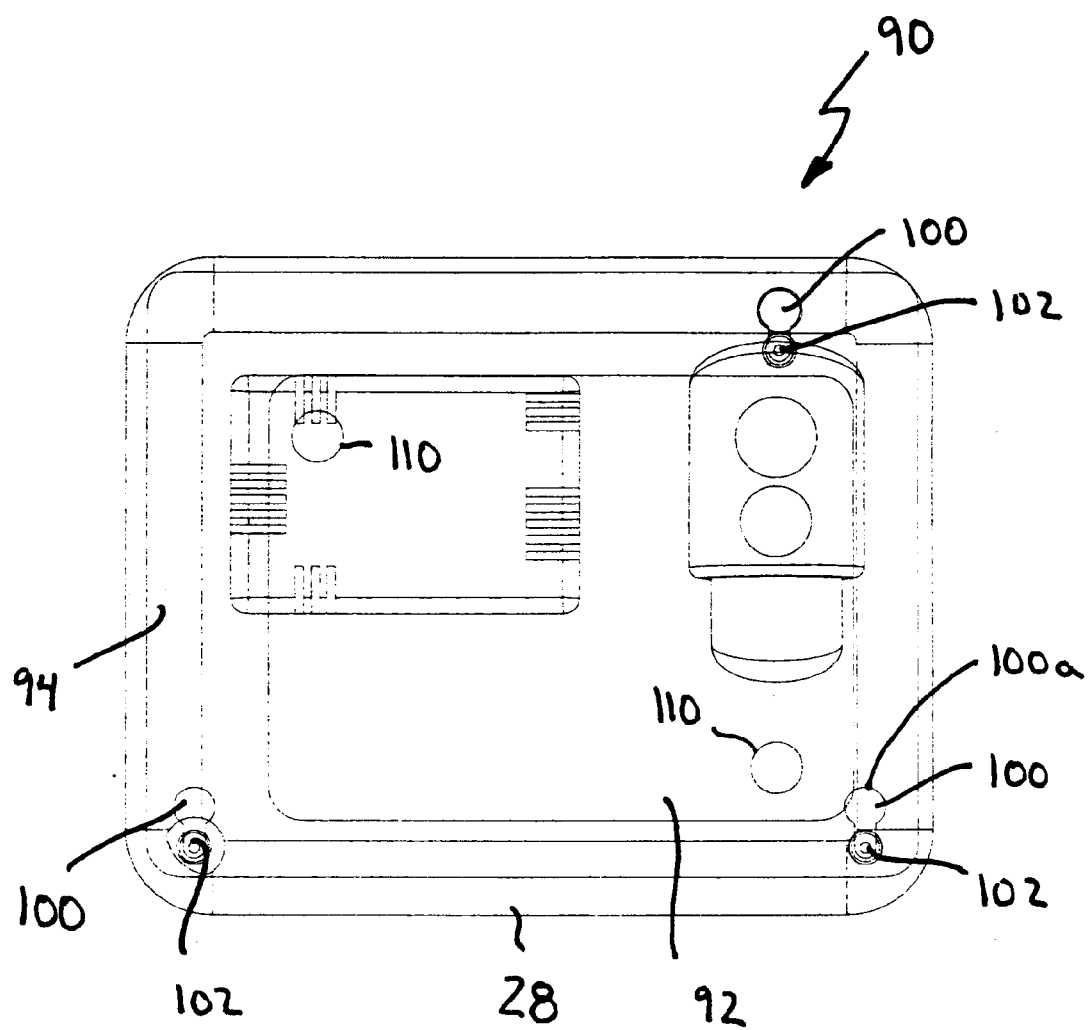
FIG. 6 is a top plan view of the projector mounting assembly of FIG. 5.

A depending arm 72 is coupled to the distal end of the extension 54 by a lockable joint 74. The arm 72 supports a projector mounting assembly 90 as best seen in FIGS. 5 and 6. The projector mounting assembly 90 includes upper and lower generally rectangular plates 92 and 94 that are spaced apart by a flexible bushing 96 formed of rubber. A fastener 98 passes through the bushing 96 to secure the plates 92 and 94 together. The lower plate 94 has a plurality of keyhole slots 100 provided therein. The keyhole slots 100 accommodate pins 102 extending upwardly from the top of the projector 28. The larger diameter portions 100a of the keyhole slots 100 are threaded to accommodate tamperproof fasteners (not shown) to inhibit the projector 28 from being removed from the projector mounting assembly 90.

The projector mounting assembly 90 also includes a pair of adjustment mechanisms 104 to allow the lower plate 94 to be tilted with respect to the upper plate 92 thereby to orient the projector 28 so that the projector and touch sensitive display screen 26 are registered. Each adjustment mechanism 104 includes an externally threaded rod 108 that engages a threaded hole in the upper plate 92. A knob 110 is provided on the end of the rod 108 that is above the upper plate 92. The other end of the rod 108 is coupled to the lower plate 94. Thus, when the knob 100 is rotated, the threaded rod 108 advances either towards or away from the lower plate 94 depending on the direction of rotation. This of course pulls or pushes on the lower plate resulting in the lower plate 94 tilting with respect to the upper plate 92 about the flexible bushing 96.

A boom movement governor 120 is disposed on the main extrusion 52 intermediate the bracket 56 and the projector 28 and controls pivotal movement of the boom 50. In this embodiment, the governor 120 is a damper and spring arrangement including a block 122 and a sleeve 124 on the main extrusion 52 that are interconnected by a gas spring 126. Block 122 is disposed on the distal end of the main extrusion 52 while sleeve 124 is disposed on the main extrusion 52 between the block 122 and the wall 24.

Block 122 is fixed to the main extrusion 52 to inhibit its movement and accommodates the locking fastener 68. One end of the gas spring 126 is secured to the block 122. Sleeve 124 is slidable along the main extrusion 52 and has formations thereon that are received by the guide channels 58 thereby to guide movement of the sleeve 124 along the main extrusion 52. A releasable locking mechanism in the form of a brake 146 is provided on the sleeve 124. The brake 146 is actuable between a locked condition where the brake contacts the main extrusion 52 to inhibit sliding movement of the sleeve 124 and an unlocked condition where the sleeve 124 is slidable along the main extrusion 52. The brake 146 is typically maintained in the unlocked condition to permit the sleeve 124 to slide along the main extrusion 52. The other end of the gas spring 126 is secured to the sleeve 124. A pair of struts 152 extends between the sleeve 124 and the wall 24. The struts 152 are pivotally coupled to opposite sides of the sleeve 124 and are pivotally coupled to a bracket 156 secured to the wall 24 below the bracket 56.

The display screen 26 is also coupled to the bracket 156. The connection between the bracket 156 and display screen 26 permits pivotal movement of the display screen 26. Specifically, the bottom of display screen 26 can be pulled away from the wall 24 to introduce a tilt to the display surface 26a thereby allowing keystone correction to be effected. The slight tilt of the display screen 26 towards the projector 28 also facilitates writing on the display surface 26a.

During operation, the personal computer 36, which executes an applications program, provides image output that is conveyed to the projector 28 via the cabling 62. The projector 28 in turn projects images that are displayed on the display surface of the touch sensitive display screen 26. When a user contacts the display surface 26a, the display screen 26 conveys control signals to the personal computer 36. The personal computer 36 uses the control signals to update the applications program and the image output conveyed to the projector 28.

Figure 7:
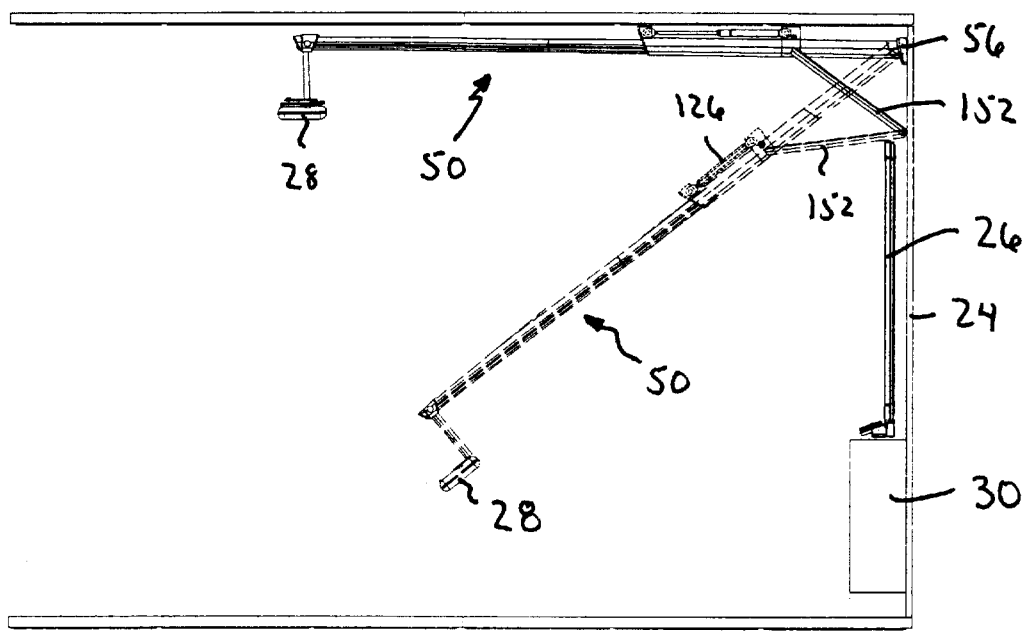
FIG. 7 is a side elevational view of the overhead projection system of FIG. 1 showing the boom in a generally horizontal disposition and in a downwardly extending condition.
Figure 8:
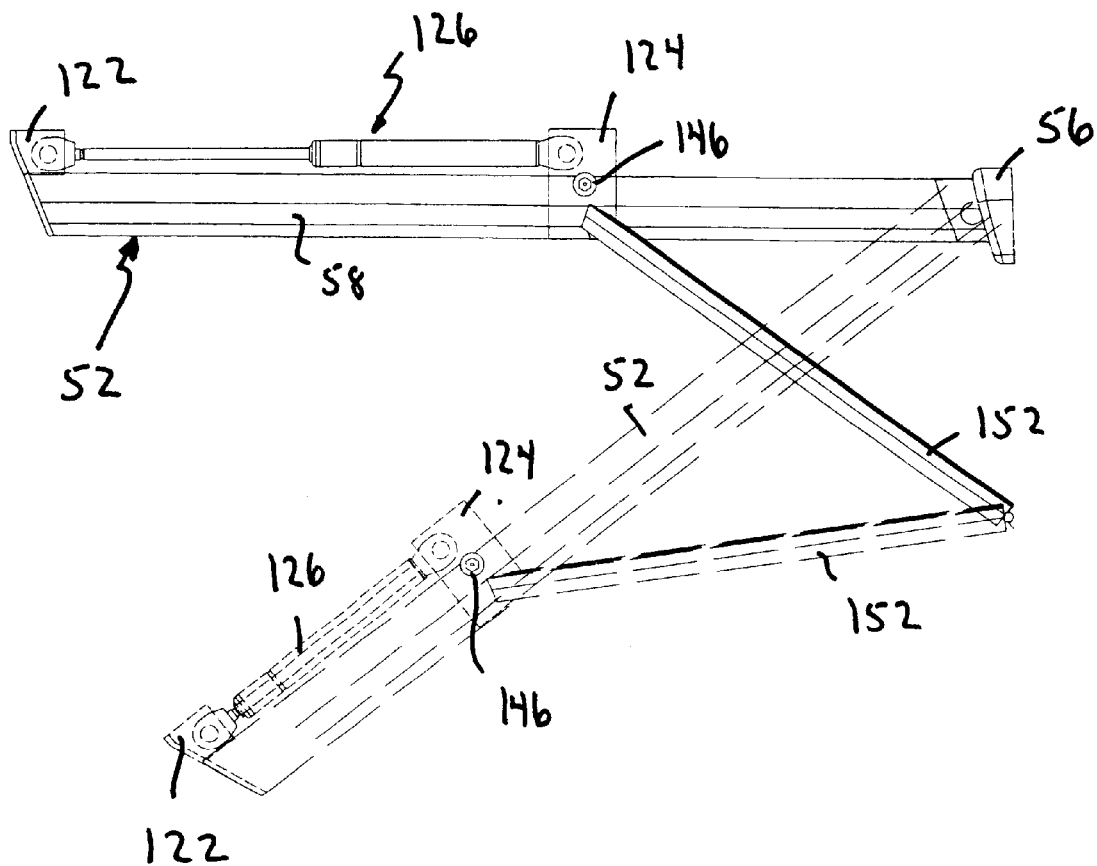
FIG. 8 is an enlarged portion of FIG. 7.

When a load is placed on the boom 50, the boom 50 pivots downwardly about the bracket 56 with the pivotal movement being controlled by the governor 120. In particular, as the boom 50 pivots downwardly, the struts 152 also pivot causing the sleeve 124 to slide along the main extrusion 52 towards the fixed block 122. This of course compresses the gas spring 126 that interconnects the fixed block 122 and the sleeve 124 as shown in FIGS. 7 and 8. Compression of the gas spring 126 controls the pivotal movement of the boom 50 in a manner so that the boom 50 pivots downwardly at a generally unconstraint rate. This quick response movement of the boom 50 avoids damage to the overhead projection system 10 and/or to the wall 24. Once the load is released from the boom 50, the gas spring 126 expands to return the boom 50 automatically to its generally horizontal disposition at a controlled generally constant rate that avoids damaging the overhead projection system as well as injury to individuals.

If the boom 50 is pivoted downwardly to service the overhead projection system 10, once the boom 50 has assumed the desired downwardly extending condition, the boom 50 can be retained in position by actuating the brake 146 on the sleeve 124. When actuated, the brake 146 engages the main extrusion 52 to inhibit sliding of the sleeve 124 along the main extrusion. This in turn inhibits pivoting of the struts 152 and thereby retains the boom 50 in position. With the boom 50 in this orientation, the projector 28 and the cabling 62 are easily accessible thereby facilitating maintenance and serviceability of overhead projection system 10. Once servicing has been completed, the brake 146 simply needs to be released to permit the sleeve 124 to slide along the main extrusion 52. This allows the gas spring 126 to return the boom 50 to its generally horizontal disposition.

Although the governor 120 as shown and described is a damper and spring arrangement, those of skill in the art will appreciate that other mechanisms to control pivotal movement of the projector support assembly to avoid damage to the projector support assembly and/or support surface can be used. For example, a clutch may be used to couple pivotally the boom 50 and the bracket 56. The clutch limits the force on the bracket 56 when a load is applied to the boom and enables downward motion of the boom 50 without allowing the boom 50 to free fall under the load. In this case a user is required to pivot the projector support assembly back to the generally horizontal disposition after the projector support assembly has been pivoted downwardly.

Figure 9:
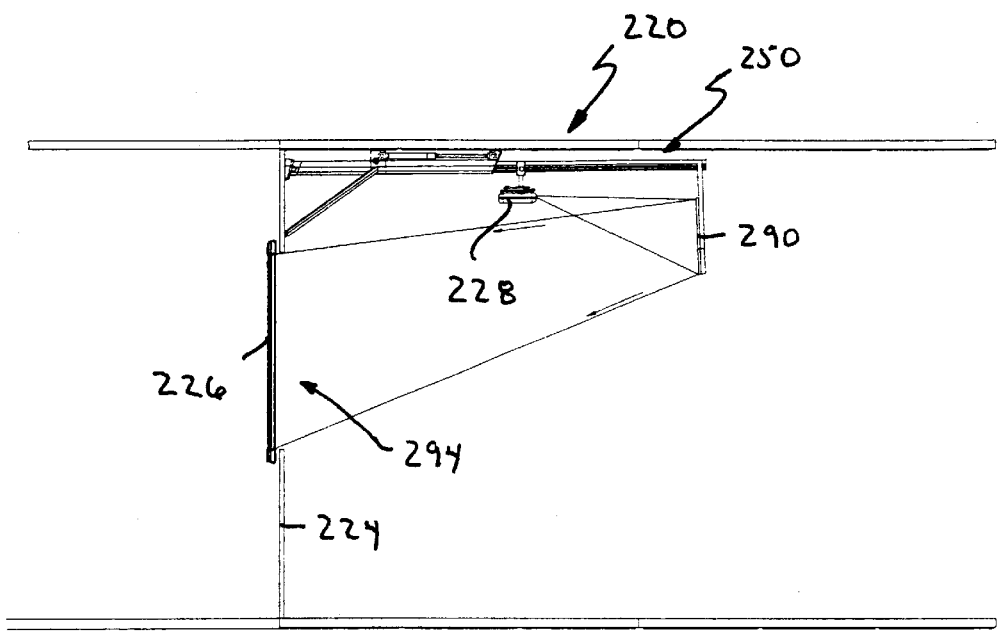
FIG. 9 is a side elevational view of another embodiment of an overhead projection system in accordance with the present invention.

Turning now to FIG. 9, another embodiment of an overhead projection system is shown and is generally identified by reference numeral 220. In this embodiment, like reference numerals will be used to indicate like components with a "200" added for clarity. As can be seen, overhead projection system 220 is similar to that of the previous embodiment. However, in this embodiment, a reflective surface in the form of a mirror 290 is suspended from the distal end of the boom 250, with the mirror 290 facing the back of a rear projection display screen 226. The projector 228 is mounted on the boom 250 intermediate the length of the boom 250 and is aimed at the mirror 290.

The display screen 226 is mounted on the wall 224 and is positioned so that its display surface covers an opening 294 in the wall. The display surface is generally translucent.

During operation of the overhead projection system 220, images projected by the projector 228 are directed toward the mirror 290. The mirror 290 in turn reflects the projected images backward onto the back of the display surface of the display screen 226. Since the display surface is translucent, images projected onto the back of the display surface are visible to viewers looking at the front of the display surface. By placing the projector 228 intermediate the length of the boom 250 and using a mirror 290 to reflect projected images backward onto the display screen 226, the length of the boom 250 can be reduced.

Figure 10:
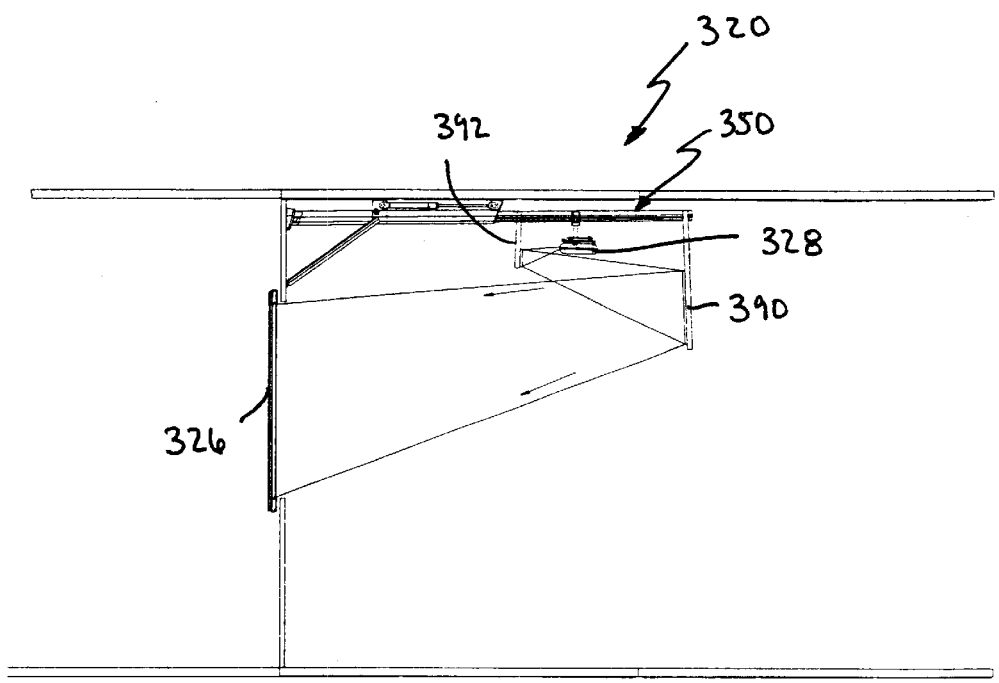
FIG. 10 is a side elevational view of yet another embodiment of an overhead projection system in accordance with the present invention.

Turning now to FIG. 10, yet another embodiment of an overhead projection system is shown and is generally identified by reference numeral 320. In this embodiment, like reference numerals will be used to indicate like components with a "300" added for clarity. As can be seen, overhead projection system 320 is also similar to that of the second embodiment but includes a pair of mirrors 390 and 392 mounted on the boom 350. Mirror 390 is suspended from the distal end of the boom 350 and faces the display screen 326. Mirror 392 is mounted on the boom 350 intermediate its length and faces the mirror 390.

During operation of the overhead projection system 320, images projected by the projector 228 are directed toward the mirror 392. The mirror 392 reflects the projected images backward onto the mirror 390. The mirror 390 in turn reflects the projected images backward onto the back of the display surface of the display screen 326. Using two mirrors allows the length of the boom 350 to be even further reduced.

Figure 11:
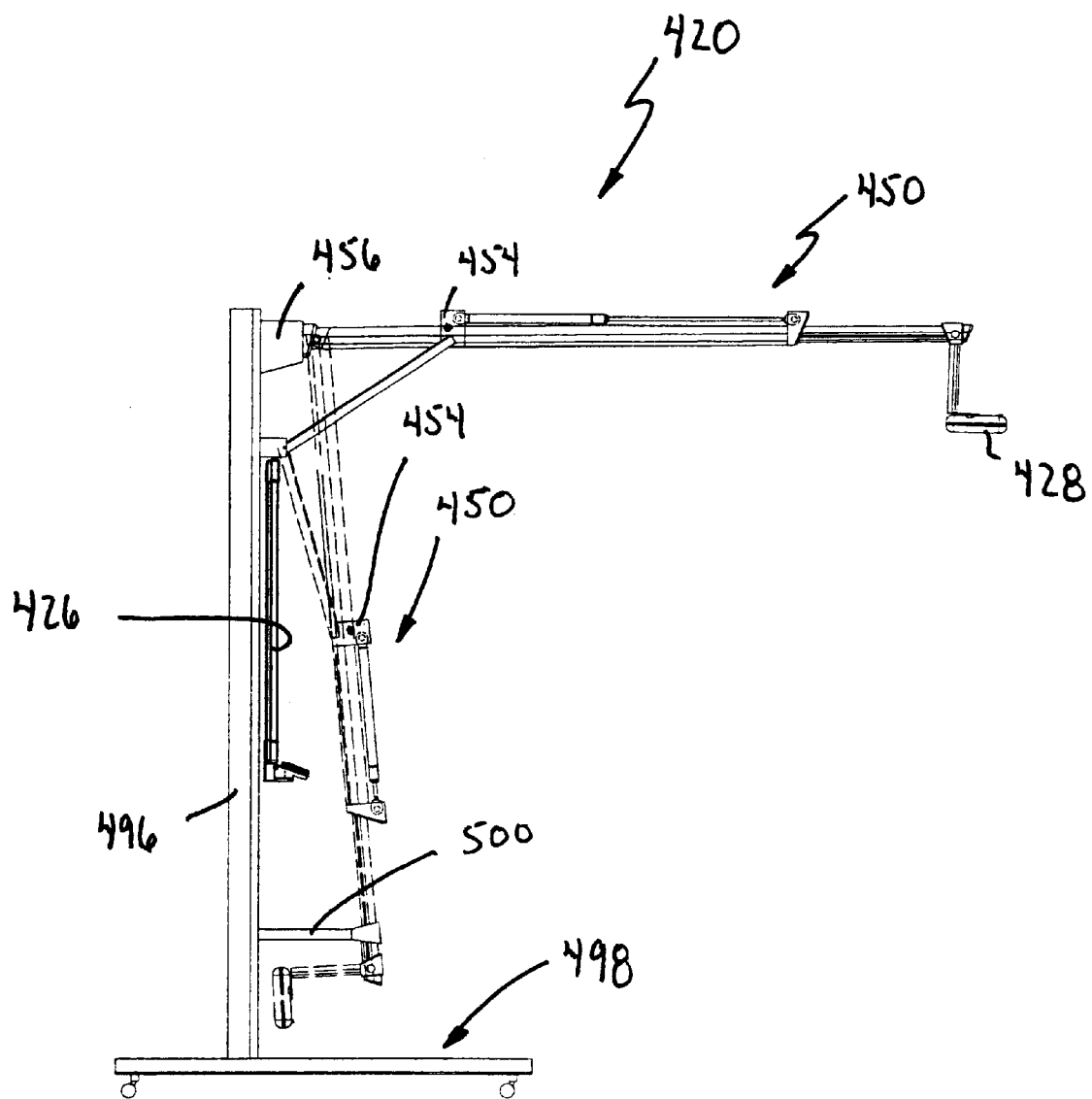
FIG. 11 is a side elevational view of still yet another embodiment of an overhead projection system in accordance with the present invention.

Turning now to FIG. 11, still yet another embodiment of an overhead projection system is shown and is generally identified by reference numeral 420. In this embodiment, like reference numerals will be used to indicate like components with a "400" added for clarity. The overhead projection system 420 is similar to that of the first embodiment but is a self-contained portable unit. As can be seen, the boom 450 is pivotally coupled to an upright support member 496 by way of a mounting bracket 456 mounted near the top of the support member 496. Support member 496 is mounted on a wheeled cart 498 allowing the overhead projection system 420 to be wheeled to the desired location.

In use with the overhead projection system 420 located at the desired location, the boom 450 is in the generally horizontal disposition so that images projected by the projector 428 are displayed on the display screen 426. When not in use or during transportation, the boom 450 is pivoted downwardly to a position where the boom is generally parallel with the support member 496. In this position, the boom can be retained in position either by engaging the brake on the sleeve 454 or by using a retaining mechanism 500 that extends outwardly from the support member 496.

As will be appreciated, the overhead projection systems described above can be easily installed by a junior audio/visual technician in a short period of time while ensuring registration of the projector and the display surface of the display screen. Also, since the display surface is able to tilt thereby to effect keystone correction, an inexpensive projector that does not include lens shifting capabilities can be used. The tilt of the display screen also facilitates writing on the display surface.

Although the display screen is described as being a SmartBoard touch sensitive display screen, those of skill in the art will appreciate that other types of touch panels may be used. Also, if a closed loop interactive display system is not required, any planar surface to display images projected by the projector may be used.

Although preferred embodiments of the present invention have been described, those of skill in the art will appreciate that variations and modifications may be made without departing from the spirit and scope thereof as defined by the appended claims.

What is claimed is:

1. An overhead projection system comprising:
   an overhead projector support assembly extending outwardly from a generally vertical support surface in a generally horizontal disposition;
   a display screen having a display surface mounted on said support surface beneath said projector support assembly; and
   a projector mounted on said projector support assembly and aimed to project images onto the display surface of said display screen.

2. An overhead projection system according to claim 1 wherein said projector support assembly is pivotably mounted on said support surface.

3. An overhead projection system according to claim 2 wherein said projector support assembly is pivotable from said generally horizontal disposition downwardly when a load is placed on said projector support assembly.

4. An overhead projection system according to claim 3 wherein said projector support assembly includes a governor to control pivotal movement of said projector support assembly in a manner so that said projector support assembly pivots downwardly generally at an unconstrained rate.

5. An overhead projection system according to claim 4 wherein said governor is a damper and spring arrangement that automatically returns said projector support assembly to said generally horizontal disposition at a generally constant rate when said load is removed from said projector support assembly.

6. An overhead projection system according to claim 5 wherein said projector support assembly includes a releasable locking mechanism actuable to retain said projector support assembly in a downwardly extending condition.

7. An overhead projection system according to claim 6 wherein said releasable locking mechanism is carried by said damper and spring arrangement.

8. An overhead projection system according to claim 7 wherein said projector support assembly includes a boom, said boom having one end pivotally coupled to said support surface, said projector being suspended from an opposite end of said boom, said damper and spring arrangement being disposed on said boom intermediate the ends thereof.

9. An overhead projection system according to claim 8 wherein said damper and spring arrangement is constituted by a gas spring having one end fixed to said boom and an opposite end fixed to an element moveable along said boom, said moveable element moving along said boom towards said fixed end during downward pivotal movement of said boom thereby to compress said gas spring.

10. An overhead projection system according to claim 1 wherein said display screen is tilted so that said display surface is angled upwardly towards said projector.

11. An overhead projection system according to claim 10 wherein said display screen is a touch panel that generates control signals representing contacts with said touch panel and wherein said overhead projection system further includes a computer executing an applications program and providing image output to said projector, said touch panel, computer and projector forming a closed loop to define an interactive display system whereby control signals generated by said touch panel are used by said computer to update said applications program and the image output provided to said projector.

12. An overhead projection system according to claim 11 wherein said projector support assembly is pivotably mounted on said support surface.

13. An overhead projection system according to claim 12 wherein said projector support assembly is pivotable from said generally horizontal disposition downwardly when a load is placed on said projector support assembly.

14. An overhead projection system according to claim 13 wherein said projector support assembly includes a releasable locking mechanism actuable to retain said projector support assembly in a downwardly extending condition.

15. An overhead projection system according to claim 14 wherein said projector support assembly includes a governor to control pivotal movement of said projector support assembly in a manner so that said projector support assembly pivots downwardly generally at an unconstrained rate.

16. An overhead projection system according to claim 15 wherein said governor is a damper and spring arrangement that automatically returns said projector support assembly to said generally horizontal disposition at a generally constant rate when said load is removed from said projector support assembly.

17. An overhead projection system according to claim 11 further including a console disposed beneath said display screen, said console accommodating said computer.

18. An overhead projection system according to claim 17 wherein said console further accommodates audio/visual equipment.

19. An overhead projection system according to claim 3 wherein said generally vertical support surface is a portable upright support member.

20. An overhead projection system according to claim 19 wherein said upright support member is mounted on a wheeled cart.

21. An overhead projection system according to claim 20 wherein said projector support assembly includes a governor to control pivotal movement of said projector support assembly in a manner so that said projector support assembly pivots downwardly generally at an unconstrained rate.

22. An overhead projection system according to claim 21 wherein said governor is a damper and spring arrangement that automatically returns said projector support assembly to said generally horizontal disposition at a generally constant rate when said load is removed from said projector support assembly.

23. An overhead projection system according to claim 22 wherein said projector support assembly includes a releasable locking mechanism actuable to retain said projector support assembly in a downwardly extending condition.

24. An overhead projection system comprising:
an overhead projector support assembly extending outwardly from a generally vertical support surface in a generally horizontal disposition;
a display screen having a display surface mounted on said support surface beneath said projector support assembly;
a projector mounted on said projector support assembly; and
at least one reflective surface positioned to reflect images projected by said projector onto said display surface.

25. An overhead projection system according to claim 24 wherein said at least one reflective surface is at least one mirror mounted on said projector support assembly.

26. An overhead projection system according to claim 25 wherein said projector support assembly is pivotably mounted on said support surface.

27. An overhead projection system according to claim 26 wherein said projector support assembly is pivotable from said generally horizontal disposition downwardly when a load is placed on said projector support assembly.

28. An overhead projection system according to claim 27 wherein said projector support assembly includes a governor to control pivotal movement of said projector support assembly in a manner so that said projector support assembly pivots downwardly generally at an unconstrained rate.

29. An overhead projection system according to claim 28 wherein said governor is a damper and spring arrangement that automatically returns said projector support assembly to said generally horizontal disposition at a generally constant rate when said load is removed from said projector support assembly.

30. An overhead projection system according to claim 29 wherein said projector support assembly includes a releasable locking mechanism actuable to retain said projector support assembly in a downwardly extending condition.

31. An overhead projection system according to claim 28 wherein said display screen is generally translucent and is positioned so that said display surface covers an opening in said support surface, said projector being aimed away from said support surface, said mirror being mounted on said projector support assembly and positioned to reflect projected images backward toward said support surface and onto the back of said display surface.

32. An overhead projection system according to claim 28 wherein said at least one mirror includes a first mirror and a second mirror, said display screen being generally translucent and positioned so that said display surface covers an opening in said support surface, said projector being aimed towards said support surface, said first mirror being mounted on said projector support assembly between said projector and said support surface and said second mirror being mounted on said projector support assembly behind said projector, said first mirror being positioned to reflect projected images away from said support surface and onto said second mirror, said second mirror being positioned to reflect said projected images backward onto the back of said display surface.

33. An overhead projector support assembly comprising:
   at least one boom adapted to extend outwardly from a generally vertical support surface in a generally horizontal disposition and to support a projector at a location spaced from said support surface;
   at least one coupling element adapted to couple pivotally one end of said at least one boom to said support surface to enable said at least one boom to be pivoted downwardly from said generally horizontal disposition under a load; and
   a governor to control pivotal movement of said boom in a manner so that said boom pivots downwardly under said load at a generally unconstrained rate and automatically returns to said generally horizontal disposition at a generally constant rate when said load is removed.

34. An overhead projector support assembly according to claim 33 wherein said governor is a damper and spring arrangement that automatically returns said at least one boom to said generally horizontal disposition when said load is removed.

35. An overhead projector support assembly according to claim 34 wherein said damper and spring arrangement includes a releasable locking mechanism actuable to retain said at least one boom in a downwardly extending condition.

36. An overhead projector support assembly according to claim 35 wherein said damper and spring arrangement is disposed on said at least one boom intermediate the ends thereof.

37. An overhead projector support assembly according to claim 36 including a single boom and wherein said damper and spring arrangement is constituted by a gas spring having one end fixed to said boom and an opposite end fixed to an element moveable along said boom, said moveable element moving along said boom towards said fixed end during downward pivotal movement of said boom thereby to compress said gas spring.

38. A portable overhead projection system comprising:
   a portable upright support member;
   an overhead projector support assembly extending outwardly from said support member in a generally horizontal disposition;
   a display screen having a display surface mounted on said support member beneath said projector support assembly;
   a projector mounted on said projector support assembly, said projector projecting images for display on said display surface, wherein said projector support assembly is pivotable from said horizontal disposition downwardly when a load is placed thereon; and
   a governor to control pivotal movement of said projector support assembly in a manner so that said boom pivots downwardly under said load at a generally unconstrained rate and automatically returns to said generally horizontal disposition at a generally constant rate when said load is removed.

39. A portable overhead projection system according to claim 38 wherein said support member is a wheeled cart.

40. A portable overhead projection system according to claim 39 wherein said projector support assembly is pivotable to a position where said projector support assembly extends generally parallel to said support member.

41. A portable overhead projection system according to claim 40 wherein said governor is a damper and spring arrangement on said projector support assembly that automatically returns said projector support assembly to said generally horizontal disposition when said load is removed from said projector support assembly.

42. A portable overhead projection system according to claim 41 wherein said projector support assembly includes a releasable locking mechanism actuable to retain said projector support assembly in a downwardly extending condition.

43. A portable overhead projection system according to claim 41 further including a retaining mechanism extending outwardly from said support member to retain said projector support assembly in a downwardly extending position.

44. An overhead projection system comprising:
   a display screen having a display surface lying in a generally vertical plane;
   a boom member extending outwardly in a generally horizontal orientation above said display screen; and
   a projector mounted on said boom member, said projector projecting images that are displayed on said display surface.

45. An overhead projection system according to claim 44 wherein said boom member is pivotable relative to said display screen.

46. An overhead projection system comprising:
   a display screen having a display surface lying in a generally vertical plane;
   a boom member extending outwardly in a generally horizontal orientation above said display screen, said boom member being pivotable from said generally horizontal disposition downwardly when a load is placed on said boom member;
   a projector mounted on said boom member, said projector projecting images back towards said display screen for display on said display surface; and
   a pivot control mechanism to return said boom member to said generally horizontal orientation at a generally constant rate when said load is removed from said boom member.

47. An overhead projection system according to claim 46 wherein said pivot control mechanism allows said boom member to pivot downwardly under said load generally at an unconstrained rate.

48. An overhead projection system according to claim 47 wherein said pivot control mechanism is a damper and spring arrangement on said boom member.

49. An overhead projection system according to claim 46 further including a releasable locking mechanism actuable to retain said boom member in a downwardly extending condition.

50. An overhead projection system according to claim 46 wherein said display screen is a touch panel that generates control signals representing contacts with said touch panel and wherein said overhead projection system further includes a computer executing an applications program and providing image output to said projector, said touch panel, computer and projector forming a closed loop to define an interactive display system whereby control signals generated by said touch panel are used by said computer to update said applications program an d the image output provided to said projector.

51. An overhead projection system according to claim 50 further including a console disposed beneath said display screen, said console accommodating said computer.

52. An overhead projection system according to claim 51 wherein said console further accommodates audio/visual equipment.

53. An overhead projection system comprising:
- a display screen having a display surface lying in a generally vertical plane;
- a boom member extending outwardly in a generally horizontal orientation above said display screen, said boom member being pivotable downwardly under a load;
- a projector mounted on said boom member, said projector projecting images for display on said display screen;
- at least one reflective surface on said boom member, said reflective surface reflecting images projected by said projector onto said display surface; and
- a pivot control mechanism to return said boom member to said generally horizontal orientation at a generally constant rate when said load is removed from said boom member.

54. An overhead projection system according to claim 53 wherein said pivot control mechanism allows said boom member to pivot downwardly generally at an unconstrained rate under said load.

55. An overhead projection system according to claim 53 further including a releasable locking mechanism actuable to retain said boom member in a downwardly extending condition.

56. An overhead projection system according to claim 53 wherein said display screen is generally translucent and is positioned so that said display surface covers an opening in a support surface to which said display screen is mounted, said projector being aimed away from said support surface, said mirror being mounted on said boom member and positioned to reflect projected images backward toward said support surface and onto the back of said display surface.

57. An overhead projection system according to claim 54 wherein said at least one mirror includes a first mirror and a second mirror, said display screen being generally translucent and positioned so that said display surface covers an opening in a support surface to which said display screen is mounted, said projector being aimed towards said support surface, said first mirror being mounted on said boom member between said projector and said support surface and said second mirror being mounted on said projector support assembly behind said projector, said first mirror being positioned to reflect projected images away from said support surface and onto said second mirror, said second mirror being positioned to reflect said projected images backward onto the back of said display surface.

* * * * *